US010884606B1

(12) United States Patent
Taylor

(10) Patent No.: US 10,884,606 B1
(45) Date of Patent: Jan. 5, 2021

(54) DATA TRANSFER VIA TILE OVERLAY

(71) Applicant: Wells Fargo Bank, N.A., San Francisco, CA (US)

(72) Inventor: Benjamin Taylor, Williston, VT (US)

(73) Assignee: WELLS FARGO BANK, N.A., San Francisco, CA (US)

(*) Notice: Subject to any disclaimer, the term of this patent is extended or adjusted under 35 U.S.C. 154(b) by 0 days.

(21) Appl. No.: 16/447,241

(22) Filed: Jun. 20, 2019

(51) Int. Cl.
G06F 3/0486 (2013.01)
G06F 9/451 (2018.01)
G06Q 20/08 (2012.01)
G06F 3/0488 (2013.01)
G06F 3/0482 (2013.01)
G06F 3/0484 (2013.01)
G06F 3/0481 (2013.01)

(52) U.S. Cl.
CPC .......... G06F 3/0486 (2013.01); G06F 3/0482 (2013.01); G06F 3/04817 (2013.01); G06F 3/04847 (2013.01); G06F 3/04883 (2013.01); G06F 9/451 (2018.02); G06Q 20/085 (2013.01)

(58) Field of Classification Search
CPC .................................................... G06F 3/0486
USPC .......................................................... 715/748
See application file for complete search history.

(56) References Cited

U.S. PATENT DOCUMENTS

| | | | |
|---|---|---|---|
| 6,064,984 A | 5/2000 | Ferguson et al. | |
| 7,627,658 B2 | 12/2009 | Levett et al. | |
| 8,881,060 B2* | 11/2014 | Chaudhri | G06F 3/04812 715/835 |
| 9,639,852 B2 | 5/2017 | Low et al. | |
| 9,900,280 B2 | 2/2018 | Geppert et al. | |
| 9,965,795 B2 | 5/2018 | Underwood | |
| 10,019,133 B1* | 7/2018 | McNeill | G06F 3/0486 |
| 10,134,017 B1 | 11/2018 | Ebersole et al. | |
| 10,185,989 B2 | 1/2019 | Ritter et al. | |
| 2008/0141304 A1* | 6/2008 | Otsu | H04N 5/44543 725/40 |
| 2008/0301046 A1* | 12/2008 | Martinez | G06Q 20/10 705/39 |
| 2009/0288012 A1 | 11/2009 | Hertel et al. | |
| 2011/0252374 A1* | 10/2011 | Chaudhri | G06F 3/0482 715/835 |
| 2012/0069131 A1* | 3/2012 | Abelow | G06Q 10/067 348/14.01 |
| 2012/0179976 A1* | 7/2012 | Lee | G06F 3/0482 715/748 |
| 2014/0123044 A1* | 5/2014 | Xie | G06F 3/0486 715/769 |
| 2014/0136407 A1 | 5/2014 | Hazam et al. | |
| 2014/0181686 A1* | 6/2014 | Shin | G06F 3/0485 715/748 |

(Continued)

Primary Examiner — William D Titcomb
(74) Attorney, Agent, or Firm — Foley & Lardner LLP

(57) ABSTRACT

A management system of a computing device provides enhanced functionality via selectable icons (e.g., tiles), presented on a home screen, that may be overlaid to perform overlay operations such as data transfer, payment, and/or granting of certain authorizations or permissions. Users are able to more readily perform cross-application and/or cross-entity operations via, for example, the operating system of a computing device without needing to engage with as many entities (or applications thereof). Tile overlay operations may be managed and reviewed via an application.

16 Claims, 6 Drawing Sheets

(56) References Cited

U.S. PATENT DOCUMENTS

| | | | |
|---|---|---|---|
| 2014/0279415 A1* | 9/2014 | Hazam | G06Q 20/10 |
| | | | 705/39 |
| 2015/0019422 A1 | 1/2015 | Low et al. | |
| 2015/0193108 A1* | 7/2015 | Li | G06F 40/134 |
| | | | 715/748 |
| 2016/0170599 A1* | 6/2016 | Guegan | G06F 3/039 |
| | | | 715/748 |
| 2016/0283923 A1 | 9/2016 | Hertel et al. | |
| 2017/0153782 A1 | 6/2017 | Sharifi et al. | |
| 2017/0221144 A1* | 8/2017 | Ram | G06Q 40/06 |
| 2019/0146652 A1* | 5/2019 | Zhou | G06F 3/04883 |
| | | | 715/748 |

* cited by examiner

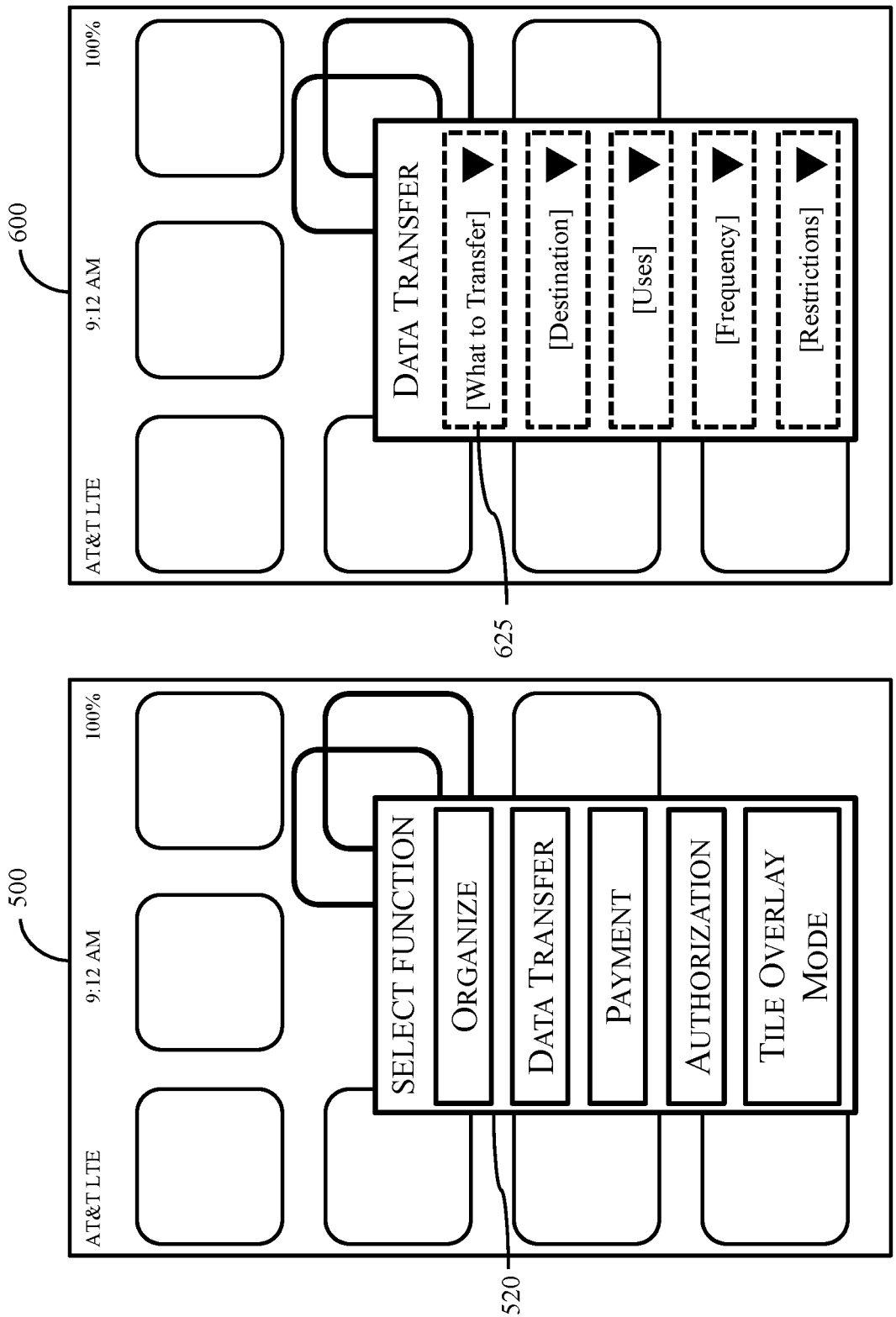

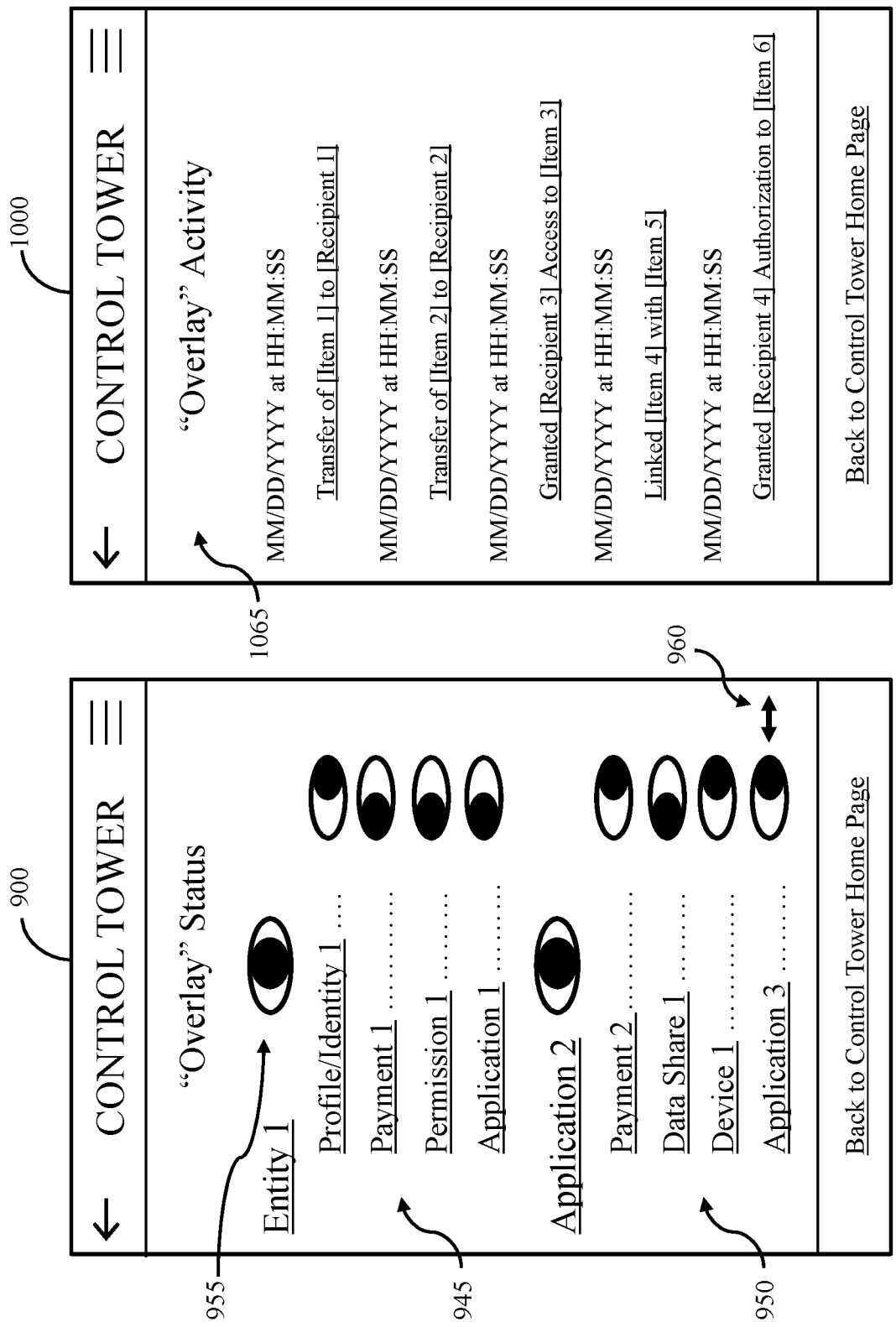

US 10,884,606 B1

DATA TRANSFER VIA TILE OVERLAY

TECHNICAL FIELD

The present disclosure relates generally to an operating environment that provides access to multiple applications via tiles or other selector elements, and to initiation of data transfers or other functionality involving applications (and/or back-end devices corresponding to the applications) via manipulation of the selector elements for the applications.

BACKGROUND

A mobile computing device, such as a smartphone or tablet computer, may be capable of running multiple applications. To allow users to select applications, the mobile device displays a set of tiles, with one tile for each installed application. The user may be allowed to select one of the tiles to choose a corresponding application. When a tile is selected, the mobile device launches the corresponding application. The mobile device may allow the user to organize the visual presentation of application tiles by changing the relative positions of the tiles on the display and by grouping tiles into folders labeled with such categories as "Weather" and "Games."

SUMMARY

Various embodiments of the disclosure relate to a method. The method may comprise presenting a graphical user interface (GUI) on a display of a computing device. The GUI may enable selection of applications to run on the computing device. The GUI may comprise a first selectable icon corresponding to a first application, and a second selectable icon corresponding to a second application. The first icon and the second icon may be selectable in a first manner indicating selection of the first application or the second application, respectively. The first icon and the second icon may be selectable in a second manner indicating selection of the first icon or the second icon, respectively. The method may comprise detecting selection of the first icon in the second manner. The method may comprise initiating a data transfer. The data transfer may be initiated in response to detecting selection of the first icon in the second manner. The data transfer may be to a first input/output (I/O) layer of the first application, to a second I/O layer of the second application, to a first server associated with the first application, and/or to a second server associated with the second application.

In one or more implementations, the method may comprise detecting that the first icon is moved towards the second icon after being selected in the second manner. The data transfer may be initiated after detecting that the first icon is moved towards the second icon.

In one or more implementations, detecting selection of the first icon in the second manner may comprise detecting that the first icon is selected and moved towards the second icon.

In one or more implementations, detecting selection of the first icon in the second manner may comprise detecting that the first icon is moved and released. The first icon may be moved and released such that the first and second icons touch or at least partially overlap. The method may comprise initiating the data transfer after the first icon is released such that the first and second icons touch each other or at least partially overlap.

In one or more implementations, the method may comprise presenting a second GUI. The second GUI may enable selections for customization of the data transfer. In one or more implementations, the second GUI may be first presented upon detection of overlap of the first and second icons.

In one or more implementations, the data transfer may transfer a dataset. The dataset may be transferred from a system software of the computing device, such as an operating system of the computing device. The dataset may have been received from the first I/O layer of first application, from the second I/O layer of the second application, from the first server associated with the first application, and/or from the second server associated with the second application.

In one or more implementations, initiating the data transfer may comprise initiating a transfer of a dataset. The method may comprise receiving the dataset from the first I/O layer of first application, from the second I/O layer of the second application, from the first server associated with the first application, and/or from the second server associated with the second application. The dataset may be received after selection of the first icon in the second manner is detected.

In one or more implementations, initiating the data transfer initiates a transfer of a dataset by the first I/O layer of first application, by the second I/O layer of the second application, by the first server associated with the first application, and/or by the second server associated with the second application.

In one or more implementations, the display is a touchscreen display. The first and second icons may be selectable via touch.

In one or more implementations, the first manner of selection may cause the application corresponding to the selected icon to launch. The second manner of selection may cause the selected icon to become movable within the GUI. The second manner of selection may comprise a hold and release gesture.

In one or more implementations, initiating the data transfer may comprise initiating a transfer of a payment token. The payment token may be transferred to the first server and/or to the second server.

In one or more implementations, the method may comprise detecting a deactivation input. The deactivation input may be detected by one of the first and second applications. The payment token may be deactivated in response to detection of the deactivation input.

In one or more implementations, the payment token may be transferred to the second server. The deactivation input may be detected via the second application. Deactivating the payment token may comprise transmitting to the second server an instruction to deactivate the payment token. The instruction may be transmitted via the first application and/or via the first server.

In one or more implementations, the method may comprise presenting a success icon indicating whether the data transfer is complete. The success icon may be presented in the GUI.

In one or more implementations, detecting selection of the first icon in the second manner may comprise detecting that the first icon is moved and released such that the first and second icons at least partially overlap. Presenting the success icon may comprise presenting the success icon while the first and second icons at least partially overlap.

Various embodiments of the disclosure relate to a method. The method may comprise presenting a GUI comprising a first selectable icon corresponding to a first application and a second selectable icon corresponding to a second application. The GUI may be presented on a touchscreen display of a mobile device. Each of the first and second icons may be selectable by a user of the mobile device in a first manner and in a second manner. Selection in the first manner may correspond with, result in, cause, or enable launching of the corresponding application. Selection in the second manner may correspond with, result in, cause, or enable movement or repositioning of the corresponding icon. The method may comprise detecting that the first icon has been moved or repositioned such that the first and second icons contact each other or at least partially overlap. The method may comprise initiating a transfer. The transfer may be a data transfer. The data that is transferred may comprise a payment token. The data may be transferred to the second application. Alternatively or additionally, the data may be transferred to a server or computing device associated with the second application. The transfer may be via the first application, via a first server associated with the first application, and/or via a second server associated with the second application.

In one or more implementations, the transfer may be initiated via an operating system of the mobile device.

In one or more implementations, the method may comprise detecting a deactivation input. The deactivation input may be detected via the first application and/or via the second application. The method may comprise deactivating the payment token. The payment token may be deactivated in response to detection of the deactivation input.

Various embodiments of the disclosure relate to a mobile device. The mobile device may comprise one or more I/O interfaces that enable outputs to users (e.g., display of GUIs) and inputs from users (e.g., accepting of user inputs via touch, pointer, or otherwise). The mobile device may comprise a processor and a memory storing instructions for system software which, when executed by the processor, cause the processor to provide specific functionality and/or otherwise configure the mobile device to perform certain functions. The mobile device may be configured to present, via the one or more I/O interfaces, a set of selectable icons. The set of icons may be selectable by touch. Each icon may correspond to a different application such that selection of each icon launches a corresponding application. The mobile device may be configured to detect a select-and-move operation of a first icon and overlaying of the first icon with a second icon. The first icon may correspond with a first application. The second icon may correspond with a second application. The mobile device may be configured to initiate a data transfer. The data transfer may be from one of the first and second applications to the other of the first and second applications. Alternatively or additionally, the data transfer may be between a first server corresponding with the first application and a second server corresponding with the second applications.

In one or more implementations, the mobile device may be configured to present a second GUI. The second GUI may be presented following detection of overlaying of the first icon at least partially over the second icon. The second GUI may enable selections for customization of the data transfer.

These and other features, together with the organization and manner of operation thereof, will become apparent from the following detailed description and the accompanying drawings.

BRIEF DESCRIPTION OF THE DRAWINGS

FIG. 5 presents example icons that may be selected to indicate an operation to be performed upon detection of tile overlay, according to potential embodiments.

FIG. 6 presents example icons that may be selected to indicate, via the home screen, a data transfer to be performed upon detection of tile overlay, according to potential embodiments.

FIG. 9 presents an example application screen allowing for control over operations performed via tile overlay, according to potential embodiments.

FIG. 10 presents an example application screen allowing for review of operations performed via tile overlay, according to potential embodiments.

DETAILED DESCRIPTION

Figure 1:
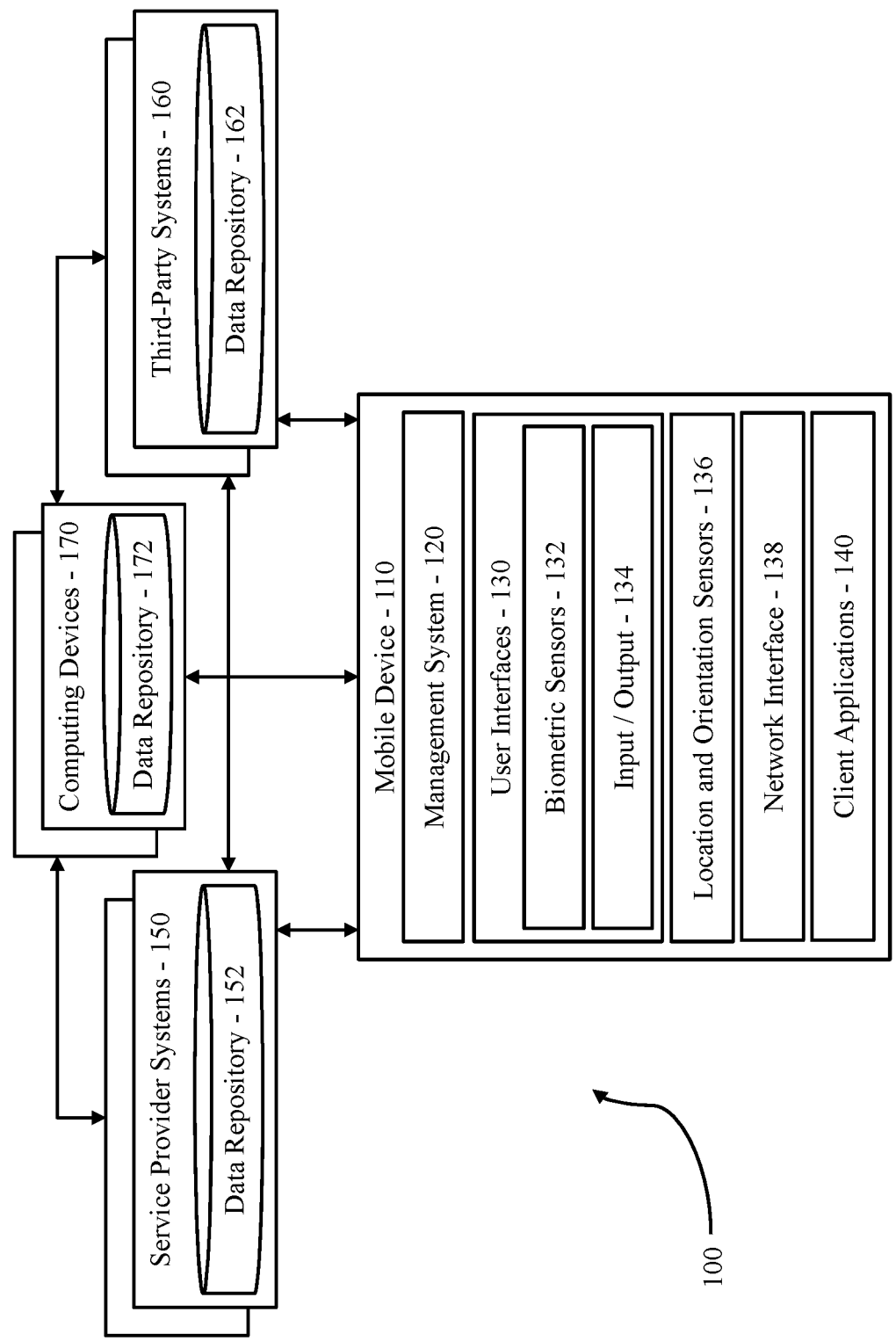
FIG. 1 is a block diagram of an example computer-implemented system, with a mobile device in communication with various systems and devices, according to potential embodiments.

Various embodiments described herein relate to computing devices, methods, and computing systems for providing enhanced functionality via selectable/activatable icons (e.g., tiles or other selector elements) that identify or otherwise correspond with applications that may run on a computing device. The icons may be presented via a graphical user interface (GUI) on a display of the computing device. The icons may be a part of a home screen or "command center" for the computing device. The command center may be presented by an operating system or other management system (e.g., application or function management software or hardware of the computing device).

The GUI presented by the management system may allow users to indicate selection of a tile for application launch (or, if already launched, to bring a corresponding application to the foreground), or selection of the tile for movement of the tile on the GUI (e.g., to customize relative positions for some or all tiles). For example, if the GUI is presented on a touchscreen, tile selection for application launch may be indicated by a touch and release gesture, while tile selection for movement may be indicated by a touch and hold gesture. While continuing to "hold" (e.g., without lifting the finger used to touch the screen at the location of the tile), the user may "drag" or otherwise cause the tile to move within the GUI by, for example, moving his or finger on the screen (with the tile being moved in response to detection of the movement of the finger) to where the user would like the tile to be located. If a first tile is overlaid with a second tile, the management system may allow users to perform one or more "overlay" operations, such as data transfer, payment, and/or granting of certain authorizations or permissions.

In some embodiments, the management system also allows for overlaying of tiles for the purpose of modifying tile presentation, such as grouping of tiles together into desired categories (e.g., "folders"). To select a grouped tile, the user may first select the grouping (e.g., folder) and then select the application tile corresponding with an application to be launched, brought to the foreground, or otherwise selected. If tiles may be overlaid for more than one purpose (e.g., organization of tiles versus cross-application or cross-entity overlay operations), the management system may allow users to indicate which operation is intended (e.g., a data transfer rather than placement of tiles into folders) for the tile overlay via different inputs. For example, for a GUI presented on a touchscreen, the management system may allow the user to indicate tile organization upon detection of one gesture or action, and cross-application or cross-entity overlay operations upon detection of another gesture or action.

As used herein, "tile overlay" refers to partial or complete overlap of tiles (or other selector elements) or to touching of tiles. In certain implementations, tile overlay may refer to orientating or positioning of tiles such that a distance between two tiles (after being reoriented or repositioned) is less than a distance between the two tiles in their default positions (before being reoriented or repositioned). Two or more tiles may be overlaid by moving the tiles relative to each other. In various embodiments, more than two tiles may be overlaid to perform one or more operations involving multiple applications and/or multiple entities associated therewith. If more than two tiles are to be overlaid, in certain embodiments, the management system may provide for a "tile overlay mode" that allows a user to continue to stack tiles until the tile overlay mode is exited. In certain embodiments, the order in which tiles are overlaid may be used to indicate which operation is to be performed (e.g., the first tile selected for movement may correspond with a source of data, while the second tile onto which the first tile is overlaid may correspond with a recipient of the data). Similarly, which tile is sandwiched by which other tiles may be indicative of what operation is to be performed.

In some embodiments, an operation to be performed upon detection of tile overlay may depend on a location or orientation of the mobile device. For example, detection of overlay of a first tile with a second tile may present a first set of functions, options, or selectable icons if the mobile device is detected (e.g., via a GPS device of the mobile device) to be geographically located in a first area (e.g., near a store of an entity associated with the application corresponding with one of the tiles), but a second set of functions, options, or selectable icons if the mobile device is detected to be geographically located in a second area (e.g., at home or work). In certain embodiments, the desired functionality (e.g., tile overlay for organization of tiles as opposed to tile overlay for performing cross-application and/or cross-entity overlay operations) may be based at least in part on an orientation or movement of the mobile device (as detected, e.g., using location and/or orientation sensors of the mobile device). In some embodiments, the same gesture or other input may indicate a different operation depending on, for example, how the mobile device is being held by the user.

Embodiments of the disclosure provide a management system that allows for performance of certain operations and functionality involving two or more applications, and/or two or more computing devices of entities associated with the two or more applications, through interaction with the management system of the computing device rather than through interaction with either of the applications. This enhances ease of use and functionality of computing devices. Whereas, before, a device may have only allowed for manipulation of tiles for arrangement and organization, users are now able to more readily perform cross-application and/or cross-entity operations via, for example, the operating system of a computing device without needing to engage with as many entities (or applications or computing devices of the entities).

Referring to FIG. 1, a block diagram of an example system 100 enabling performance of various operations via tile overlay, according to potential embodiments, is depicted. The system 100 includes a mobile device 110 (e.g., a smartphone, smart watch or other wearable device, tablet computer, laptop, or other computing device that includes a display and that is capable of running applications), one or more service provider systems 150, one or more third-party systems 160, and one or more computing devices 170. The mobile device 110 may include a management system 120, which may be, or may comprise, an operating system or other system software of the mobile device, or may be or may comprise other software or hardware providing control over an operating environment of the mobile device 110. In some implementations, the management system 120 may be or may comprise, for example, iOS, Windows 10 Mobile, or Android.

Mobile device 110 may include one or more user interfaces 130, which may include one or more biometric sensors 132 (such as a fingerprint reader, a heart monitor that detects cardiovascular signals, an iris scanner, etc.). User interfaces 130 may also include input/output components 134 that provide perceptible outputs (such as displays and light sources for visually-perceptible elements, a speaker for audible elements, and haptics for perceptible signaling via touch, etc.) that capture ambient sights and sounds (such as cameras, microphones, etc.), and/or that allow the user to provide inputs (such as a touchscreen, stylus, force sensor for sensing pressure on a display screen, etc.).

Mobile device 110 may include one or more location and orientation sensors 136 to enable the mobile device 110 to determine its location relative to, for example, other physical objects or relative to geographic locations. Example location sensors 136 include global positioning system (GPS) devices and other navigation and geolocation devices, digital compasses, gyroscopes and other orientation sensors, as well as proximity sensors or other sensors that allow the mobile device 110 to detect the presence and relative distance of nearby objects and devices. The mobile device 110 may include one or more network interfaces 138 that allow the mobile device 110 to communicate wirelessly or otherwise with other devices and systems. The mobile device 110 may include client applications 140, such as an Internet browser and applications provided or authorized by an entity implementing or administering a service provider system 150, a third-party system 160, and/or a user device 170.

The system 100 includes one or more service provider systems 150 (e.g., a computing system of a financial institution or other service provider), which may be implemented using, for example, servers and/or various other computing devices. The system 100 may also include one or more computing devices 170 (such as Internet of things (IoT) devices such as vehicles, smart assistants/smart speakers, etc.). The system 110 may moreover include one or more third-party systems 160 (e.g., a computing system of an entity that provides one or more client applications 140 running on the mobile device 110), which may be implemented using, for example, servers and/or various other computing devices. The service provider systems 150, third-party systems 160, and computing devices 170 may include data repositories 152, 162, and 172, respectively, with data related to users of the mobile device 110 and/or other entities, such as data that is sent or received in a data transfer performed following detection of a tile overlay. The components of the system 100 may be communicably and operatively coupled to each other over a network that permits the direct or indirect exchange of data, values, instructions, messages, and the like (represented by the double-headed arrows in FIG. 1).

Each system or device in system 100 may include one or more processors, memories, network interfaces, and user interfaces. The memory may store programming logic that, when executed by the processor, controls the operation of the corresponding computing system or device. The memory may also store data in databases. The network interfaces allow the computing systems and devices to communicate wirelessly or otherwise. The various components of devices in system 100 may be implemented via hardware (e.g., circuitry), software (e.g., executable code), or any combination thereof. Devices and components in FIG. 1 can be added, deleted, integrated, separated, and/or rearranged in various embodiments of the disclosure.

Figure 2:
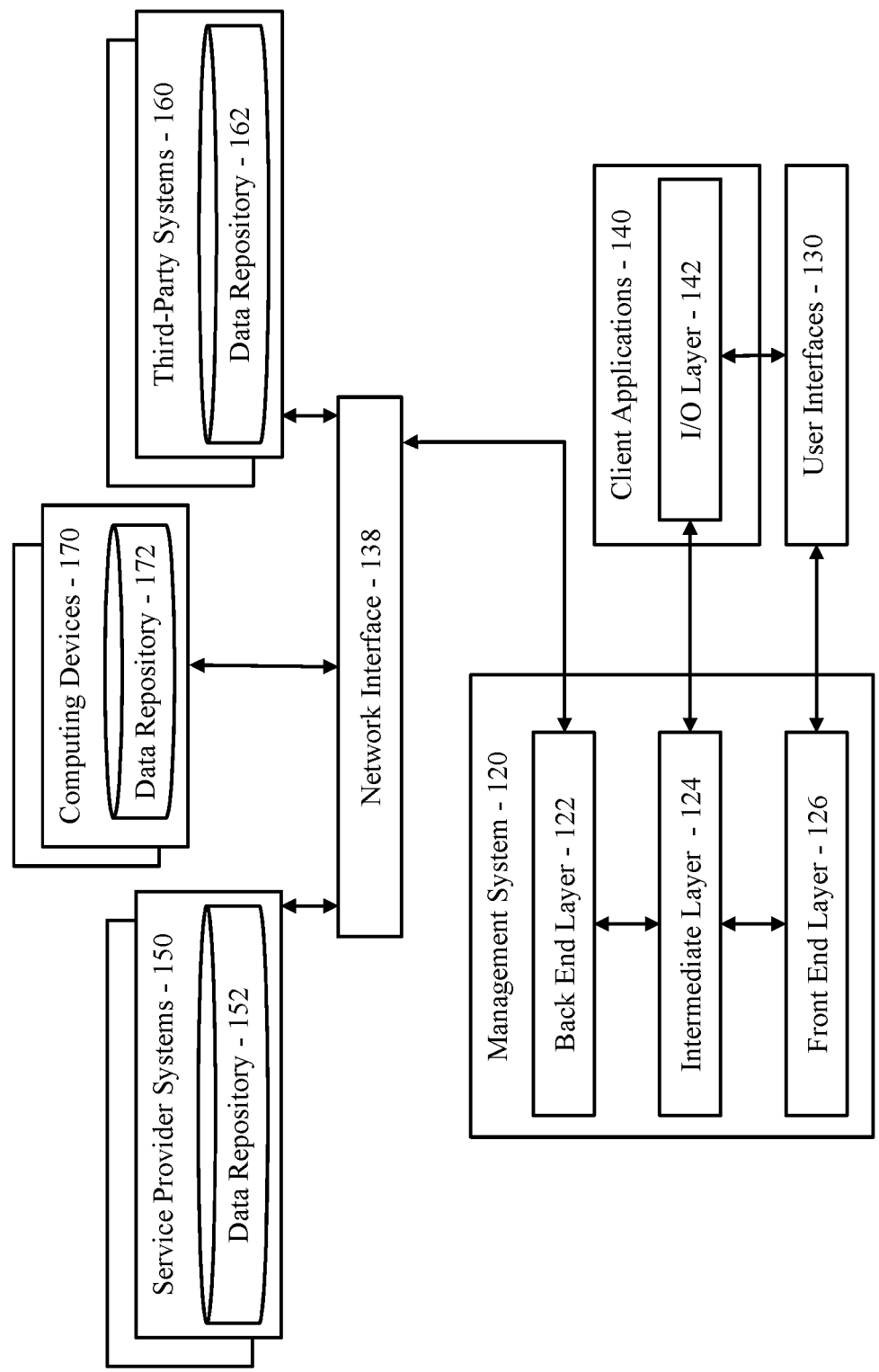
FIG. 2 depicts an example management system of the mobile device of FIG. 1, according to potential embodiments.

FIG. 2 depicts components of management system 120 and the interaction thereof with components of system 100, according to potential embodiments. The management system 120 may include a back end layer 122, an intermediate layer 124, and a front end layer 126. The front end layer 126 may engage and/or exchange information with users via one or more user interfaces 130. The intermediate layer 124 may interface with, control, and/or exchange data with client applications 140 installed on the mobile device 110. And the back end layer 122 may interface and/or exchange data (e.g., via network interface 138) with one or more service provider systems 150, third-party systems 160, and/or user devices 170, directly or indirectly. Client applications 140 may include, for example, an input/output (I/O) layer 142 able to exchange data with users of mobile device 110 via user interfaces 130 and/or with management system 120 (via, e.g., intermediate layer 124).

Tile overlay operations may be performed in various different ways. For example, upon detection of overlay of a first tile with a second tile, the management system 120 may retrieve data from a first client application 140 (e.g., via I/O layer 142) and/or from a third-party system 160 corresponding with the first tile and provide the data (or a subset thereof) to a second client application 140 corresponding with the second tile and/or to a third-party system 160 corresponding with the second tile. The management system 120 may, for example, retrieve data (or initiate data retrieval by another computing device) directly from third-party systems 160 and/or computing devices 170, or indirectly via service provider systems 150 (e.g., via API calls by service provider systems 150 to third-party systems 160).

Similarly, upon detection of overlay of the first tile with the second tile, the management system 120 may initiate a payment from a first account associated with, accessed using, and/or managed via the first client application 140, to a second account associated with, accessed using, and/or managed via the second client application 140. Alternatively or additionally, the management system 120 (e.g., via back end layer 122) may, for example, transmit a request or other message to a first third-party system 160 or computing device 170 of a first entity associated with the first application 140 to cause a data transfer, payment, authorization, etc. to a second third-party system 160 or computing device 170 of a second entity associated with the second application 140. In various embodiments, the management system 120 may perform overlay operations by communicating, directly or indirectly, with any combination of one or more client applications 140, service provider systems 150, third-party systems 160, and/or user devices 170.

Figure 4:
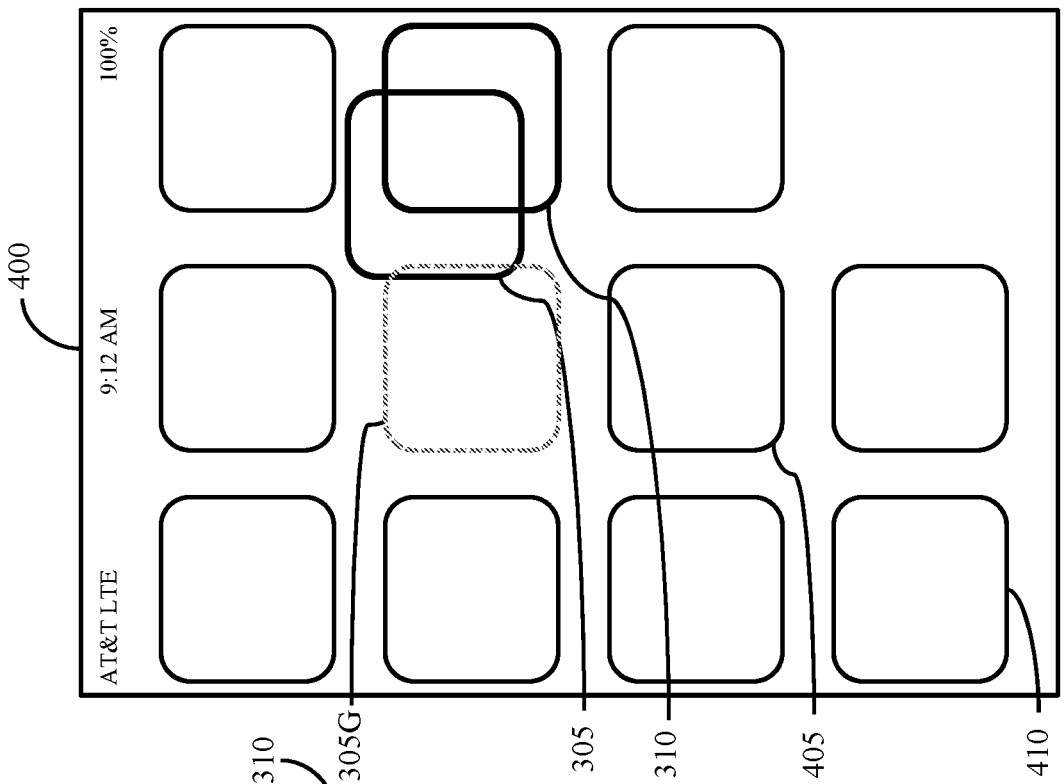
FIG. 4 presents the GUI of FIG. 3, with a first application tile moved to overlay with a second application tile, according to potential embodiments.
Figure 3:
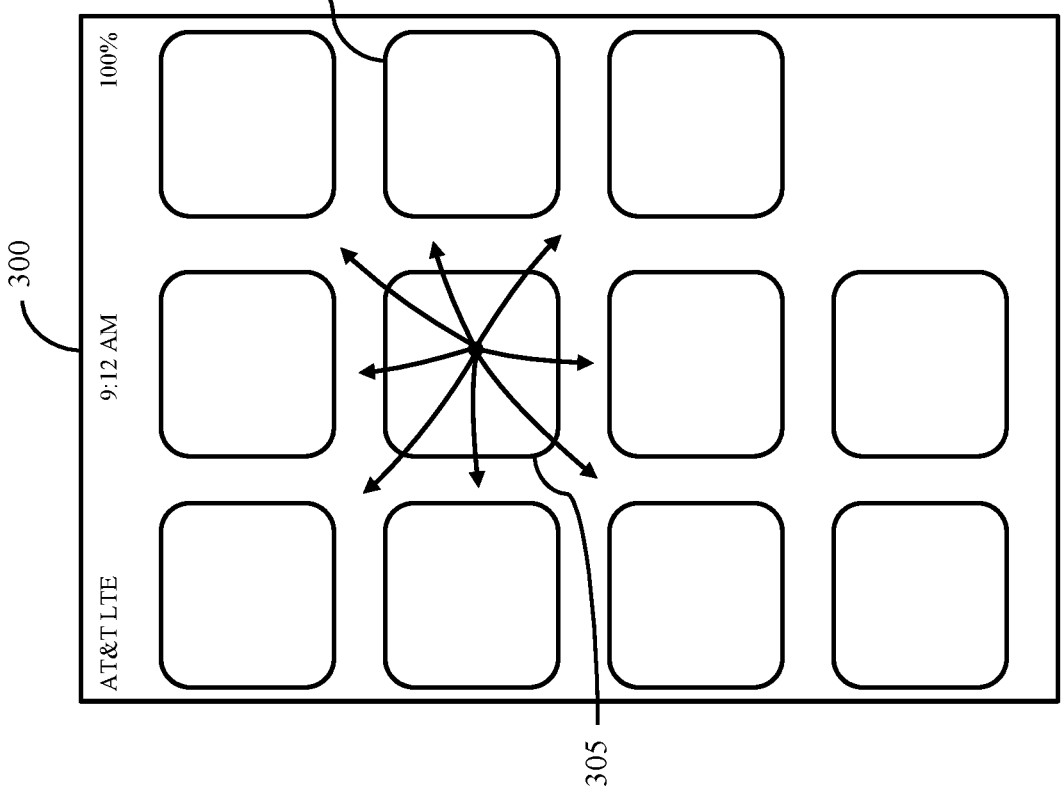
FIG. 3 presents an example home screen of the mobile device of FIGS. 1 and 2, with a graphical user interface (GUI) that presents application tiles that may be selected and repositioned on the home screen, according to potential embodiments.

Illustrated in FIG. 3 is an example display 300 of a mobile device 110 presenting a home screen of the mobile device 110, according to potential embodiments. The home screen depicted in FIG. 3 includes a GUI that presents 11 tiles, including tiles 305 and 310, with each tile corresponding with an application that is installed (or installable) on the mobile device 110. The arrows emanating from tile 305 indicate that tile 305 may be selected and moved in various directions from its current position. In FIG. 4, the example display 400 of the mobile device 110 presents the home screen of FIG. 3, with tile 305 moved to overlay with tile 310.

In various embodiments, the home screen of mobile device 110 may provide for a tile overlay mode that is initiated upon detection of a certain gesture or other input, such as a double or triple tap at the top of the home screen, somewhere above the first row of tiles, or other gestures or inputs that differ from gestures or inputs used to indicate application launch or tile movement. The tile overlay mode may allow the user to continue to stack tiles (e.g., a third tile onto the stack of tiles that, in FIG. 4, includes tiles 305 and 310). Overlaying three or more tiles may allow the user to transfer data, make payments, provide authorizations, or perform other operations involving multiple applications, entities, and/or devices. For example, data may be transferred from one account (or multiple accounts) to multiple other accounts, and/or data may be transferred from multiple sources to one destination (or multiple destinations). Similarly, payments may be made from one account (or multiple accounts) to multiple other accounts, or from multiple accounts to one other account (or multiple other accounts).

In certain implementations, a tile overlay mode may allow the user to produce multiple stacks. For example, the user may move tile 405 onto tile 410 for a second stack that includes tiles 405 and 410, in addition to the first stack that includes tiles 305 and 310. In some implementations, multiple stacks may be produced when the same type of operation is to be performed with respect to different sets of tiles. For example, a first stack may be used to make a payment from a first account to a second account, and a second stack may be used to make the same or similar payment (e.g., the same amount and/or from the same account) from a third account to a fourth account. In some implementations, when a first tile is moved towards another, a "ghost" image or impression 305G of the tile may be displayed at the tile's original position, to allow the user to move the same tile onto multiple other tiles to produce multiple stacks that may have one or more tiles in common. For example, the user may be allowed to move the first tile onto the second tile to transfer data from the first application to the second application, and to move a ghost image of the first tile onto the third tile to also transfer data from the first application to the third application.

FIG. 5 provides an example display 500 of a mobile device 110 presenting a home screen of the mobile device 110, according to potential embodiments. Once two tiles are overlaid (e.g., tiles 305 and 310), the management system 120 may, in various embodiments, present a GUI such as GUI 520 to allow the user to select what function is to be performed. For example, GUI 520 may allow the user to select "organize" to, for example, combine the overlaid tiles into a folder or other grouping for organization purposes.

GUI 520 may also allow the user to select other overlay operations, such as "data transfer" to transfer data, "payment" to make a payment, "authorization" to grant a permission, "tile overlay mode" to enter a tile overlay mode to overlay more than two tiles (e.g., to select additional tiles to overlay with the first two overlaid tiles) or to produce more than one stack of tiles (e.g., to select a third tile to overlay with a fourth tile), or other operations. In some embodiments, GUI 520 may be presented the first time two tiles are overlaid to select a default operation, or each time two tiles are overlaid to select one-time operations. In other implementations, the particular function to be performed may be selected or otherwise indicated by the user via different gestures, motions, touchscreen pressure levels, and/or other inputs (rather than by making a selection via a GUI such as GUI 520).

FIG. 6 provides an example display 600 of a mobile device 110 presenting a home screen of the mobile device 110, according to potential embodiments. Once two tiles are overlaid with each other in a manner (e.g., via a particular gesture or pressure level on a touchscreen) corresponding with a data transfer, and/or once the "data transfer" icon is selected via GUI 520, the management system 120 may, in various embodiments, present a GUI such as GUI 625 to allow the user to make one or more selections with respect to a data transfer.

For example, GUI 625 may present drop-down menus or other selector elements corresponding to any combination of: "what to transfer" to allow the user to select, for example, what data is to be transferred (e.g., one or more of a digital ID, a payment token corresponding with a credit or debit card or other payment method, a user profile with personal data like name and address, account data with preferences and/or selections, list of prior transactions or other activities, etc.); "destination" to allow the user to select, for example, what application, device, account, or entity is to receive data (e.g., the application corresponding with the second tile with which the first tile is overlaid, the entity associated with the second application corresponding with the second tile with which the first tile is overlaid, an account such as a financial account or social media account, an e-mail address for, e.g., generation of an e-mail message with the data to be transferred, a mobile number for, e.g., generation of a text message with the data to be transferred, etc.); "uses" to allow the user to select, for example, for what purpose the data is to be transferred (e.g., for opening a new account, for posting to a social media account, etc.); "frequency" to allow the user to, for example, indicate the number of times the data is to be transferred (e.g., on a one-time basis, on an ongoing basis, on a periodic basis, such as daily, weekly, or monthly, etc.); and/or "restrictions" to allow the user to, for example, place restrictions and/or impose limitations on the data transfer (e.g., to require confirmation each time, to expire after a certain time, such as in a week, month, or year, etc.).

Figure 7:
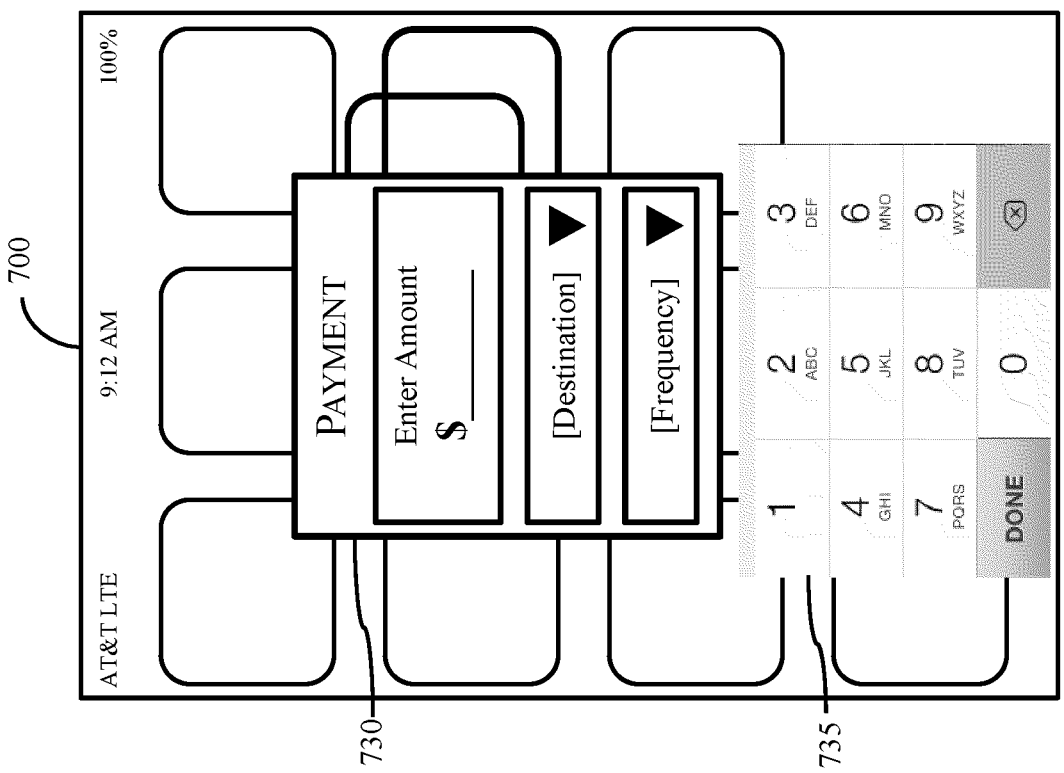
FIG. 7 presents an example GUI that allows for one or more payments to be submitted, via the home screen, upon detection of tile overlay, according to potential embodiments.

FIG. 7 provides an example display 700 of a mobile device 110 presenting a home screen of the mobile device 110, according to potential embodiments. Once two tiles are overlaid in a manner corresponding with a payment, and/or once the "payment" icon is selected via GUI 520, the management system 120 may, in various embodiments, present a GUI such as GUI 730 to allow the user to make a payment. The GUI 730 may be accompanied by keypad 735 to allow the user to enter, for example, an amount to be paid in an "enter amount" region (if, e.g., the amount is not otherwise known or presumed). GUI 730 may also present drop-down menus for "destination" to allow the user to, for example, select what entity or account is to receive the funds to be paid, for "frequency" to allow the user to, for example, indicate the number of times the payment is to be made (e.g., on a one-time basis, on an as-incurred basis, on a periodic basis, such as monthly, etc.), and/or for other selections.

In various embodiments, different GUIs, functionalities, options, tasks, information, etc., may be presented or performed depending on which particular application tiles are overlaid with which other application tiles. In some implementations, two applications (and/or backend computing devices or systems) may engage in two-way dialogue once linked via tile overlay. For example, overlaying a banking application tile with a merchant application tile may result in the provisioning of a payment token to the merchant and/or to the merchant application. By contrast, overlaying the merchant application tile with the banking application tile may result in a pop-up GUI or screen that lists transactions with the merchant (e.g., purchases, payments, etc.) involving a credit card or other payment vehicle (which may have been issued by the bank associated with the banking application, and/or which may be viewed and/or managed via the banking application). These may be, for example, transactions initiated or posted in the present billing cycle or in another time period, pending transactions, etc.

Figure 8:
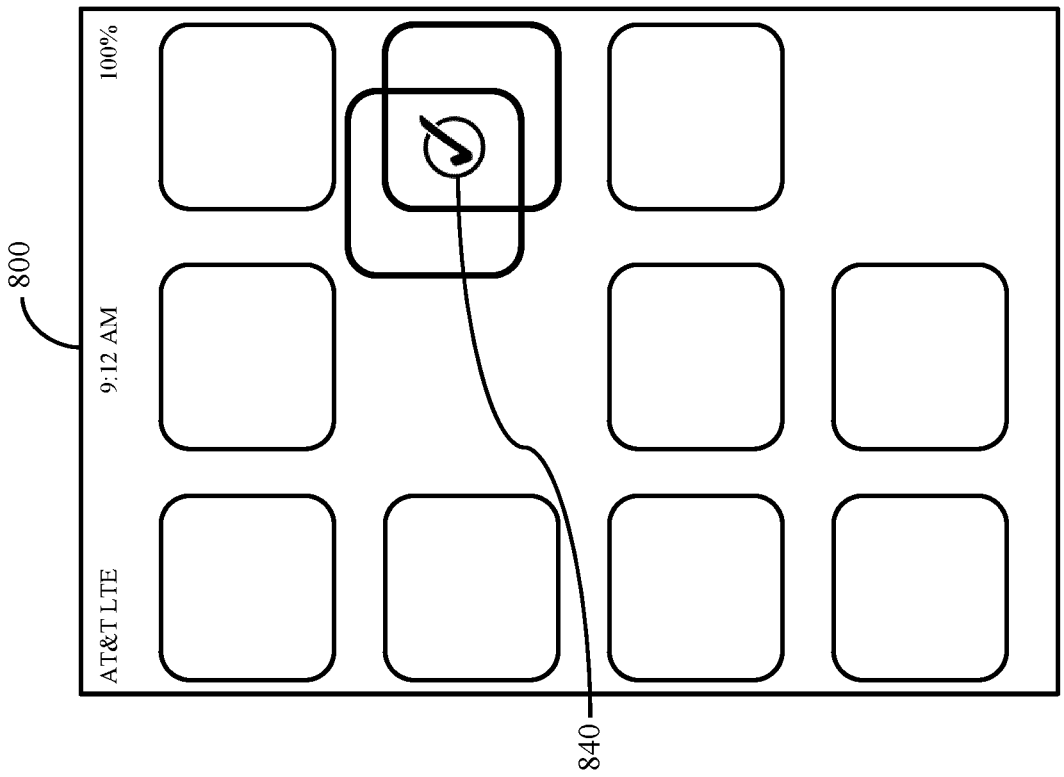
FIG. 8 presents an example success icon indicating that an operation performed following detection of tile overlay was, for example, submitted for processing or completed, according to potential embodiments.

FIG. 8 provides an example display 800 of a mobile device 110 presenting a home screen of the mobile device 110, according to potential embodiments. Once an overlay operation has been entered, submitted for processing, and/or completed, the management system 120 may present a success icon 840. In FIG. 8, success icon 840 is presented with the "stack" of overlaid tiles 305 and 310. In some embodiments, the success icon 840 is displayed for a certain time (e.g., 1, 2, or 3 seconds), after which the overlaid tiles are returned to their original or default positions. Alternatively or additionally, the success icon 840 may be presented elsewhere on the home screen, and/or may be presented after the tiles have been returned to their original or default ("pre-overlay") positions.

FIG. 9 provides an example display 900 of a mobile device 110 presenting a page of an application running on mobile device 110, according to potential embodiments. The application may be, for example, an application of a service provider (such as a financial institution) that may be used to initiate data transfers, to make payments, to manage authorizations and permissions, etc. In various embodiments, the management system 120 allows the user to run an application to manage overlay operations involving that application and/or any number of other applications running on mobile device 110.

Example display 900 presents an example "overlay status" page of an example "Control Tower" application. The status page may identify entities, applications, and/or any other recipients of data, payments, permissions, etc. For example, the status page includes "Entity 1" with items list 945 identifying items (e.g., data, permissions, communication or data links or channels, devices, applications, etc.) transferred, authorized, or linked to Entity 1 (or to a computing device associated therewith, such as third-party system 160), and "Application 2" with items list 950 identifying items transferred, authorized, or linked to Application 2 (or to a computing device associated therewith). For each entity, application, and item, a selector 955 may allow a user to activate, "turn on," begin, or otherwise enable a certain exchange of data and/or functionality, or to deactivate, "turn off," cease, or otherwise disable the exchange of data and/or functionality. In display 900, Entity 1 and Application 2 are partially enabled (as indicated by the position of the solid-black iris in the middle of the oval), rather than fully enabled or disabled, because at least one item is enabled and at least one item is disabled in corresponding lists. Also in display 900, Payment 1, Permission 1, Application 1, and Data Share 1 are enabled (as indicated by the position of the solid-black iris at the left of the oval) and Profile/Identity 1, Payment 2, Device 1, and Application 3 are disabled (as indicated by the position of the solid-black iris at the right of the oval).

For Entity 1, display 900 indicates that Profile/Identity 1 has been provided to Entity 1 via a tile overlay operation. The Profile/Identity 1 may represent, for example, a digital ID that was provided to Entity 1 in a data transfer so as to, for example, confirm identity, age, status, etc. If Profile/Identity 1 is enabled, Entity 1 may be able to continue to retrieve, update, and/or use certain data (via, e.g., third-party systems 160), and if disabled, Entity 1 would no longer be permitted to retrieve, update, and/or use the data (via, e.g., third-party systems 160). Upon deactivation of an item, a third-party system 160 may be transmitted (e.g., via an application 140, service provider system 150, and/or computing device 170) a message to indicate that, for example, the item is no longer available, and/or any subsequent requests corresponding with the item may be rejected by the recipient of the requests.

Payment 1 may represent, for example, a first payment token (corresponding with, e.g., a credit or debit card or other payment vehicle) that can be used by Entity 1 to use the corresponding payment vehicle for payments on the user's behalf. Transfer of a payment token rather than account numbers or other sensitive data enhances security, as a data breach would result in the tokenized data being compromised rather than the sensitive data itself. The first payment token may be stored, for example, as part of data repository 162 of the third-party system 160 corresponding to Entity 1. If Payment 1 is enabled, Entity 1 may be able to continue to use the first payment token for payments from the payment vehicle, and if disabled, Entity 1 would no longer be permitted to use the first payment token (e.g., the first payment token may be rendered inactive or rejected). Permission 1 may represent, for example, authorization to perform a certain action or use certain data for or on behalf of the user. If Permission 1 is enabled, Entity 1 retains authorization, and if disabled, Entity 1 is de-authorized.

Application 1 may represent, for example, authorization to Entity 1 to, directly or indirectly, exchange data or otherwise communicate with or via Application 1 for or on behalf of the user. If Application 1 is enabled, Entity 1 is authorized to provide data to or retrieve data from Application 1, and if disabled, Entity 1 is de-authorized. Entity 1 and/or Application 1 may be provided with a token that may be transmitted to verify authorization to exchange data. In various implementations, the request for data or request to communicate (potentially including or being accompanied by a token) may be initiated by either Entity 1 or Application 1.

The items in list 945 may be enabled, disabled, re-enabled, and re-disabled as desired via corresponding selectors 955. In some versions, deactivation is not reversible for certain items, such that once an item is disabled, a subsequent tile overlay operation would be required to re-enable or reactivate the item.

For Application 2, Payment 2 may represent, for example, a second payment token corresponding with another payment vehicle for payments on the user's behalf. The second payment token may be stored, for example, at mobile device 110 or elsewhere. If Payment 2 is enabled, Application 2 may be able to continue to use the second payment token for payments from the payment vehicle, and if disabled, Application 2 would no longer be permitted to use the second payment token (e.g., the token may be rendered inactive or rejected). Data Share 1 may represent, for example, authorization to retrieve (on a continuous basis, periodically, or otherwise) certain data from or via, for example, another client application 140, service provider system 150, third-party system 160, and/or computing device 170. If Data Share 1 is enabled, Application 2 retains authorization to retrieve the data, and if disabled, Application 2 is de-authorized from retrieving the data.

Device 1 may represent, for example, authorization to exchange data or otherwise communicate with (on a continuous basis, periodically, or otherwise) with, for example, a specified computing device 170. For example, Application 2 may be allowed to retrieve (directly or indirectly) health data from a health tracking or fitness device, access location or destination data from a vehicle or GPS device, etc. The Device 1 authorization may have been granted by stacking/overlaying a client application 140 corresponding with, for example, the device or a manufacturer of Device 1 with a client application 140 corresponding with, for example, the "Control Tower" application 140 or to another application 140. If Device 1 is enabled, Application 2 retains authorization to communicate with Device 1, and if Device 1 is disabled, Application 2 is de-authorized from communicating with Device 1.

Application 3 in items list 950 may represent, for example, authorization to Application 2 to, directly or indirectly, exchange data or otherwise communicate with or via Application 3 for or on behalf of the user. If Application 3 is enabled, Application 2 is authorized to provide data to or retrieve data from Application 3, and if disabled, Application 2 is de-authorized. Application 2 and/or Application 3 may be provided with a token that may be transmitted to verify authorization to exchange data. In various embodiments, Application 2 and Application 3, if "connected" by being granted authorization, may be permitted to have two-way dialogue. The request for data or request to communicate (potentially including or being accompanied by a token) may be initiated by either Application 2 or Application 3. In certain embodiments, there are restrictions on directionality, such that Application 2 (under which items 950 are listed) is granted authorization to communicate with and retrieve data from Application 3 via corresponding selectors 955, but Application 3 is not authorized to communicate with or retrieve data from Application 2 unless Application 3 is separately authorized (via, e.g., a section that includes "Application 3" and an items list underneath that includes Application 2 and a corresponding selector). Such authorization may be required, In some implementations, a two-way icon 960 (e.g., adjacent to Application 3) may indicate that two-way dialogue is authorized (e.g., between Application 2 and Application 3).

The items in list 950 may be enabled, disabled, re-enabled, and re-disabled as desired via corresponding selectors 955. In some versions, deactivation is not reversible for certain items, such that once an item is disabled, a subsequent tile overlay operation would be required to re-enable or reactivate the item.

FIG. 10 provides an example display 1000 of a mobile device 110 presenting another page of the application of FIG. 9 running on mobile device 110, according to potential embodiments. The page in FIG. 10 provides a listing of overlay activity 1065 to allow the user to review past (requested, initiated, and/or completed) data transfers, payments, etc. List 1065 indicates, for example that: Item 1 (e.g., a payment token, digital ID, or a user profile) was transferred to Recipient 1 (e.g., an application, entity, or device) at the specified data and time; Item 2 was transferred to Recipient 2 at the specified data and time; Recipient 3 was granted permission for/access to Item 3 (e.g., an account, device, or application) at the specified time; Item 4 (e.g., a device or application) was linked with Item 5 (e.g., another device or application) at the specified time to allow the two to, for example, communicate, exchange data, receive status updates, etc.; and Recipient 4 was granted authorization to Item 6 (e.g., authorization to perform an operation, retrieve certain data, access a device, or access an account) at the specified time.

It is noted that applications and entities may be provided with any combination of profiles, identities, payment tokens, permissions, data shares, and/or device different from the ones shown in FIG. 9. It is also noted that each entity, application, item, and activity in displays 900 and 1000 may be selectable to retrieve additional information and/or to make changes to statuses, identifiers, or any other related data.

The terms selectable and activatable are intended to be interchangeable. Selectable/activatable icons presented as part of example GUIs may cause a signal to be generated upon selection/activation. The signal may be transmitted to a system, device, or application to indicate to the device, system, or application which icon has been selected, and the device, system, or application may respond accordingly.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C.§ 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
presenting, on a display of a computing device, a graphical user interface (GUI) enabling selection of applications to run on the computing device, the GUI comprising a first selectable icon corresponding to a first application and a second selectable icon corresponding to a second application, the first icon and the second icon being selectable:
   in a first manner indicating selection of the first application or the second application, respectively; and
   in a second manner indicating selection of the first icon or the second icon, respectively;
detecting selection of the first icon in the second manner;
initiating a data transfer to at least one of:
   a first I/O layer of the first application;
   a second I/O layer of the second application;
   a first server associated with the first application; and
   a second server associated with the second application;
wherein initiating the data transfer comprises initiating a transfer of a payment token to at least one of the first and second servers; and
detecting a deactivation input via one of the first and second applications, and deactivating the payment token in response to detection of the deactivation input;
wherein the payment token is transferred to the second server, wherein the deactivation input is detected via the second application, and wherein deactivating the payment token comprises transmitting to the second server, via at least one of the first application and the first server, an instruction to deactivate the payment token.

2. The method of claim 1, further comprising detecting that the first icon is moved towards the second icon after being selected in the second manner, wherein the data transfer is initiated after detecting that the first icon is moved towards the second icon.

3. The method of claim 1, wherein detecting selection of the first icon in the second manner comprises detecting that the first icon is moved and released such that the first and second icons contact each other or at least partially overlap, and wherein the method comprises initiating the data transfer after the first icon is released such that the first and second icons touch each other or at least partially overlap.

4. The method of claim 3, further comprising presenting a second GUI enabling selections for customization of the data transfer.

5. The method of claim 4, wherein the second GUI is first presented upon detection of overlap of the first and second icons.

6. The method of claim 1, wherein the data transfer transfers a dataset from a system software of the computing device, the dataset having been received from at least one of:
   the first I/O layer of first application;
   the second I/O layer of the second application;
   the first server associated with the first application; or
   the second server associated with the second application.

7. The method of claim 1, wherein initiating the data transfer comprises initiating a transfer of a dataset, and wherein the method further comprises, after detecting selection of the first icon in the second manner, receiving the dataset from at least one of:
   the first I/O layer of first application;
   the second I/O layer of the second application;
   the first server associated with the first application; and
   the second server associated with the second application.

8. The method of claim 1, wherein initiating the data transfer initiates a transfer of a dataset by:
   the first I/O layer of first application;
   the second I/O layer of the second application;
   the first server associated with the first application; or
   the second server associated with the second application.

9. The method of claim 1, wherein the display is a touchscreen display, and wherein the first and second icons are selectable via touch.

10. The method of claim 1, wherein the first manner of selection causes the application corresponding to the selected icon to launch, and wherein the second manner of selection causes the selected icon to become repositionable within the GUI.

11. The method of claim 10, further comprising detecting repositioning of the first icon such that the first icon overlays with the second icon via a move and release gesture.

12. The method of claim 1, further comprising presenting, in the GUI, a success icon indicating whether the data transfer is complete.

13. A method comprising:
presenting, on a touchscreen display of a mobile device, a GUI comprising a first selectable icon corresponding to a first application and a second selectable icon corresponding to a second application, each of the first and second icons being selectable by a user of the mobile device in a first manner to launch the corresponding application and in a second manner to move the corresponding icon;
detecting that the first icon has been moved such that the first and second icons contact each other or at least partially overlap;
initiating a transfer of data to the second application via at least one of:
the first application;
a first server associated with the first application; and
a second server associated with the second applications;
wherein initiating the data transfer comprises initiating a transfer of a payment token to at least one of the first and second servers; and
detecting a deactivation input via one of the first and second applications, and deactivating the payment token in response to detection of the deactivation input;
wherein the payment token is transferred to the second server, wherein the deactivation input is detected via the second application, and wherein deactivating the payment token comprises transmitting to the second server, via at least one of the first application and the first server, an instruction to deactivate the payment token.

14. The method of claim 13, wherein data transfer is initiated via an operating system of the mobile device.

15. A mobile device comprising:
one or more I/O interfaces for displaying graphical user interfaces (GUIs) and accepting user inputs;
a processor and a memory storing instructions for system software which, when executed by the processor, cause the processor to:
present, via the one or more I/O interfaces, a set of icons selectable by touch, each icon corresponding to a different application such that selection of each icon launches a corresponding application;
detect a select-and-move operation of a first icon and overlaying of the first icon at least partially with a second icon, the first icon corresponding with a first application, and the second icon corresponding with a second application;
initiate a data transfer:
from one of the first and second applications to the other of the first and second applications; or
between a first server corresponding with the first application and a second server corresponding with the second applications;
wherein initiating the data transfer comprises initiating a transfer of a payment token to at least one of the first and second servers; and
detecting a deactivation input via one of the first and second applications, and deactivating the payment token in response to detection of the deactivation input;
wherein the payment token is transferred to the second server, wherein the deactivation input is detected via the second application, and wherein deactivating the payment token comprises transmitting to the second server, via at least one of the first application and the first server, an instruction to deactivate the payment token.

16. The mobile device of claim 15, wherein the memory further stores instructions which, when executed, cause the processor to present, following detection of overlaying of the first icon at least partially over the second icon, a second GUI enabling selections for customization of the data transfer.

* * * * *